(12) United States Patent
Yamamoto et al.

(10) Patent No.: US 10,237,423 B2
(45) Date of Patent: Mar. 19, 2019

(54) FAX SELECTION SYSTEM IN A DISTRIBUTED NETWORK

(71) Applicant: SEIKO EPSON CORPORATION, Tokyo (JP)

(72) Inventors: Hironobu Yamamoto, Shiojiri (JP); Yasuhiro Furuta, Shimosuwa-cho (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/600,211

(22) Filed: May 19, 2017

(65) Prior Publication Data

US 2017/0346959 A1 Nov. 30, 2017

(30) Foreign Application Priority Data

May 26, 2016 (JP) ................... 2016-105684

(51) Int. Cl.
| | | |
|---|---|---|
| *G06F 15/00* | (2006.01) | |
| *G06F 3/12* | (2006.01) | |
| *G06K 1/00* | (2006.01) | |
| *H04N 1/00* | (2006.01) | |
| *H04N 1/32* | (2006.01) | |
| *H04W 88/04* | (2009.01) | |

(52) U.S. Cl.
CPC ..... *H04N 1/00217* (2013.01); *H04N 1/00206* (2013.01); *H04N 1/32106* (2013.01); *H04W 88/04* (2013.01)

(58) Field of Classification Search
CPC .......... H04N 1/00217; H04N 1/00206; H04N 1/32106; H04W 88/04
USPC ................................ 358/1.15, 1.1, 1.13, 1.14
See application file for complete search history.

(56) References Cited

U.S. PATENT DOCUMENTS

| | | | | |
|---|---|---|---|---|
| 2009/0323100 | A1* | 12/2009 | Lee .................... | H04N 1/00214 358/1.15 |
| 2011/0196948 | A1* | 8/2011 | Yamauchi ............... | H04M 3/54 709/222 |
| 2015/0296067 | A1* | 10/2015 | Ishihara .................. | H04W 4/80 370/331 |
| 2016/0011830 | A1 | 1/2016 | Asakura | |
| 2017/0163842 | A1* | 6/2017 | Han ...................... | H04L 61/106 |

FOREIGN PATENT DOCUMENTS

JP 2016-21090 2/2016

* cited by examiner

*Primary Examiner* — Douglas Q Tran
(74) *Attorney, Agent, or Firm* — Workman Nydegger

(57) ABSTRACT

User convenience related to viewing reception data is improved. A fax system having a device with a fax reception capability, and a server that controls the device, connected through a network, wherein: the device registers itself on the server as a device that can receive faxes, and sends received fax data to the server; and the server receives specification of a registered device from a terminal connected to the network, and provides to the terminal the reception data received from the specified device.

4 Claims, 6 Drawing Sheets

FAX SELECTION SYSTEM IN A DISTRIBUTED NETWORK

BACKGROUND

1. Technical Field

The present invention relates to a fax system and a fax machine.

2. Related Art

Technology that uses a server connected to a network to print through a printer is known from the literature. See, for example, JP-A-2016-21090. JP-A-2016-21090 suggests technology enabling a terminal device to send data to a server, and a printer printing the data received by the server, as a result of the printer receiving and printing data sent from the server. An example of such a server is a server providing a service over the Internet, such as the Google® Cloud Print service (referred to below as Google Cloud Print (GCP)).

Fax machine users may also desire to check, from a remote location, data that was received by a fax machine. JP-A-2016-21090 does not disclose technology enabling meeting this need.

SUMMARY

A fax system and a fax machine according to the invention are directed to this problem and improve convenience for fax users.

A fax system according to the invention includes a device with a fax reception capability, and a server that controls the device, connected through a network, wherein: the device registers itself on the server as a device that can receive faxes, and sends received fax data to the server; and the server receives specification of a registered device from a terminal connected to the network, and provides to the terminal the reception data received from the specified device.

This configuration enables a user, by operating a terminal to access the server and specify a device registered on the server, to receive from the server fax data received by the specified device.

In a fax system according to another aspect of the invention, the server stores the reception data received from the specified device to a specific storage area accessible through the network; reports the address of the stored reception data to the terminal; and enables the terminal to acquire the reception data based on the address.

This configuration enables the terminal to acquire fax data received by a specified device by downloading the fax data based on specific address information received from the server.

In a fax system according to another aspect of the invention, the server updates a reception data list for each registered device based on a reception data update report sent from the device, and when the terminal specifies reception data contained in the reception data list corresponding to the specified device, provides the specified reception data to the terminal.

This configuration enables the user to specify the reception data (fax data) to view from a list of the most recent data the device received.

In another aspect of the invention, the device deletes the reception data after sending reception data to the server.

After sending reception data to the server, the device in this aspect of the invention deletes the reception data instead of continuing to store the reception data. As a result, sufficient storage capacity can be maintained on the device, and unnecessary loss of data can be prevented.

The technical concept of the invention is also not limited to embodiments of a fax system. For example, the invention may be embodied as a method including the processes executed by the fax system. The server, device, and terminal included in the fax system may also be embodied as aspects of the invention. For example, the invention may be conceived as a fax machine (device) connected to a server through a network, the fax machine (device) including: a communication unit that sends, to the server through the network, a registration request to register itself on the server as a device that can receive faxes; and a fax communication unit that receives faxes; the communication unit sending received fax data through the network to the server.

The processes executed by the server, fax machine (device), and terminal may also be separately embodied as inventions of a method, or conceived of as programs enabling the server, fax machine (device), and terminal to execute the processes, and a computer-readable storage medium storing the programs.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of the present invention are described below with reference to the accompanying figures. The accompanying figures are used to describe embodiments of the invention.

1. System Configuration

Figure 1:
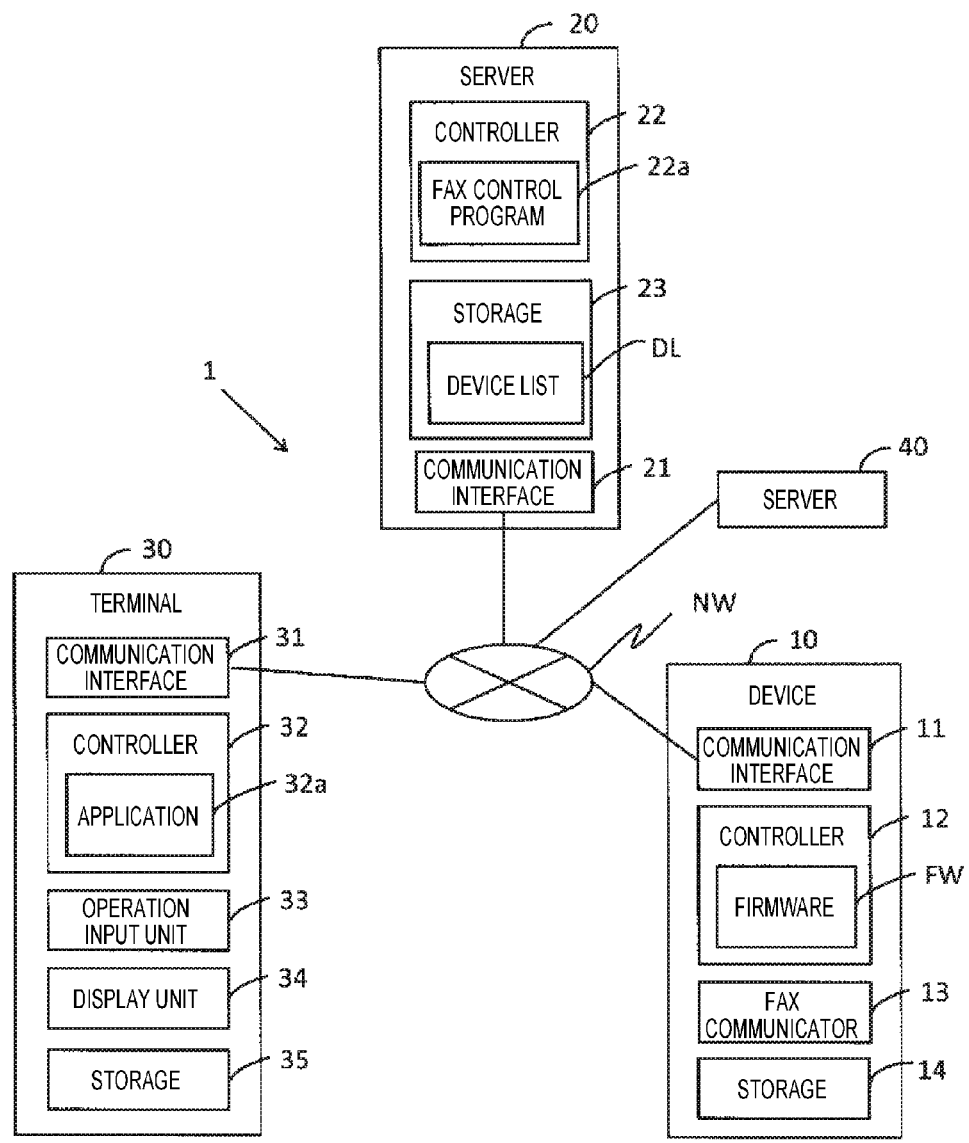
FIG. 1 is a block diagram illustrating a fax system.

FIG. 1 illustrates the configuration of a system 1 according to this embodiment. This system 1 is an example of a fax system. The system 1 includes at least a device 10, and a server 20 that controls the device 10. The system 1 may also include a client terminal (terminal 30) of the server 20. A user of the device 10 operates the terminal 30 as desired. The device 10, server 20, and terminal 30 connect to a network NW. The network NW may include the Internet or a local area network (LAN) connected to the Internet. The network NW may be wired or wireless. In the example in FIG. 1, one device 10 and one terminal 30 are shown connected to the network NW, but there may be multiple devices 10 and terminals 30.

The device 10 is a fax machine capable of sending and receiving faxes. The device 10 may also be referred to as a fax, facsimile machine, or fax machine, for example. The device 10 may also be a multifunction printer, that is, a device having printer, copier, or scanner functions in addition to sending and receiving fax capabilities. The device 10 includes a communication interface 11, controller 12, fax communicator 13, and storage 14. The communication interface 11 and controller 12 together may be referred to as a communicator.

The controller 12 is configured with IC devices including a CPU and memory, and other appropriate electronic circuits. The CPU of the controller 12 executes processes including those described below by executing operations according to a program (such as firmware FW) and communicating with the server 20. Note that the controller 12 may be configured by any one or more of multiple CPUs, ASIC (application specific circuit) devices, or other hardware components functioning alone or cooperatively as a processor to execute the processes.

The fax communicator 13 is an interface embodying fax telecommunication functions, that is, sending images (images representing text, pictures, computer graphics, or other image object) over a specific communication line, such as public telephone lines. The fax telecommunication functions of the fax communicator 13 are known from the literature, and further description thereof is omitted. The device 10 has all functions of a common fax machine.

The server 20 is a server that provides services to users over the Internet. In one example, the server 20 embodies part (a virtual server) of a cloud computing environment providing cloud services. The server 20 may be referred to as a cloud server. Alternatively, the server 20 may be a physical server. A server providing the GCP service described above is an example of a server 20. The server 20 includes a communication interface 21, controller 22, and storage 23.

The controller 22 is, for example, embodied by a CPU and memory, and other appropriate electronic circuits. The CPU of the controller 22 executes processes including those described below by executing operations according to a program (such as a fax control program 22a) and communicating with the device 10 and terminal 30.

The terminal 30 may be embodied by a personal computer (PC), smartphone, tablet computer, cell phone, or another terminal with comparable performance. The terminal 30 includes a communication interface 31, controller 32, operation input unit 33, display unit 34, and storage 35. The controller 32 is, for example, embodied by a CPU and memory, and other appropriate electronic circuits. The CPU of the controller 32 executes processes including those described below by executing operations according to a program (such as an application 32a) and communicating with the server 20.

The operation input unit 33 in this example includes a mouse, keyboard, buttons, and keys for receiving user input operations.

The display unit 34 presents information to the user, and may be configured with an LCD display panel, for example. Part of the operation input unit 33 may also be embodied by a touch panel displayed on the display unit 34.

The communication interfaces 11, 21, 31 are the interfaces of the device 10, server 20, and terminal 30 for communicating through the network NW with external devices. The communication interfaces 11, 21, 31 communicate according to specific communication protocols (such as TCP/IP, HTTP). The device 10 communicates through communication interface 11 with the server 20. The terminal 30 communicates through communication interface 31 with the server 20. The server 20 communicates through communication interface 21 with the device 10 and terminal 30.

Storage 14, 23, 35 is provided by a hard disk drive, flash memory, or other type of memory devices.

2. Registering a Device on the Server

Figure 2:
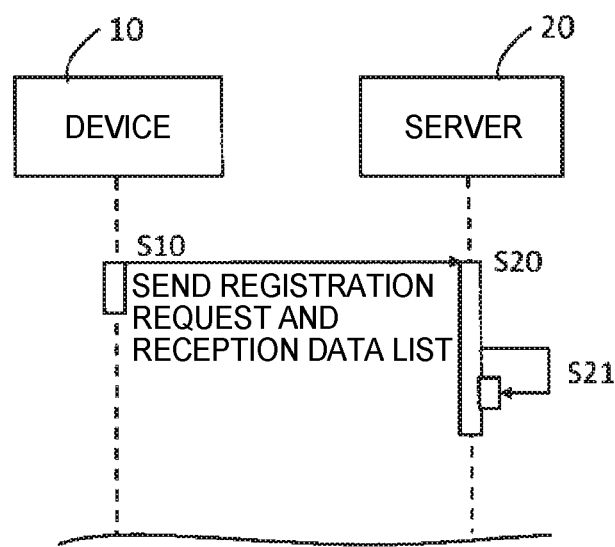
FIG. 2 illustrates a registration process for registering devices on a server.

FIG. 2 illustrates processes executed by the server 20 and device 10 when registering a device 10 on the server 20. The device 10 (controller 12) first requests the server 20 to register the device 10 as a device that can receive faxes (step S10). This request is referred to below as a registration request. The device 10 sends the registration request to the server 20 together with a list of reception data stored by the device 10 (reception data list).

Reception data as used herein is the image data received by the fax communicator 13 in a fax transmission of image data sent from an external fax machine. The reception data stored by the device 10 is the reception data stored in the storage 14 of the device 10. In other words, the device 10 stores the reception data of fax transmissions in the storage 14. The reception data list is a list of information for identifying specific reception data, such as the date and time the reception data was received, and the fax number (telephone number) of the sender.

When a registration request is received from the device 10 (step S20), the server 20 (controller 22) registers the device 10 that sent the registration request as a device that can receive faxes, and relates the reception data list included with the registration request to the registered device 10 (step S21).

Registering a device 10 as a device that can receive fax transmissions is a process of adding that device as a device capable of receiving faxes to a list (device list DL), which is stored in the storage 23 of the server 20, of devices that are already registered as devices the server 20 can control through the network NW. The device list DL is information storing, for each device 10, a combination of information for identifying the device. This information may include, for example, information identifying whether or not the device can receive faxes, a product name, MAC address, IP address, or other information).

Relating the reception data list to a particular device 10 is a process of relationally storing, in the storage 23, the reception data list received from the device 10 to the device 10 that was added to the device list DL.

If multiple devices 10 connect to the network NW as described above, this device registration process is executed for each device 10.

3. Updating the Reception Data List

Reception data stored by the device 10 can be added and deleted. When the reception data stored in the storage 14 is changed (added or deleted), the device 10 sends a new reception data list reflecting the changes to the server 20. This new reception data list is an example of a reception data update report. Alternatively, when the reception data stored in the storage 14 changes, the device 10 may send to the server 20 a list of the changes to the reception data (a difference list). The difference list is a list of newly added reception data, and/or a list of reception data that was deleted. The difference list is another example of a reception data update report. When a new reception data list or difference list is received from a device 10, the server 20 updates the reception data list stored relationally to that device 10 based on the reception data list or difference list that was received. This configuration enables maintaining the reception data list stored on the server 20 synchronized with the latest reception data stored by the device 10.

The reception data list may also be updated in response to a request from the server 20. In this event, the server 20 sends a reception data list request, at a scheduled or unscheduled time, to a device already registered in the device list DL as a fax-capable device. The device 10 that receives the reception data list request then sends the most recent reception data list to the server 20. When a reception data list is received from the device 10 in response to the reception data list request, the server 20 updates, based on the reception data list that was received, the reception data list stored relationally to that device 10.

To update the reception data list, the server 20 may also send a difference list request, at a scheduled or unscheduled time, to a device already registered in the device list DL as a fax-capable device. The device 10 that receives the difference list request then sends the most recent difference list to the server 20. When a difference list is received from the device 10 in response to the difference list request, the server 20 updates, based on the difference list that was received, the reception data list stored relationally to that device 10.

4. Reception Data Viewing Process

A reception data viewing process using the system. 1 is described next. Before the reception data viewing process can execute, the device registration process described above must be been completed for at least one device 10.

Figure 3:
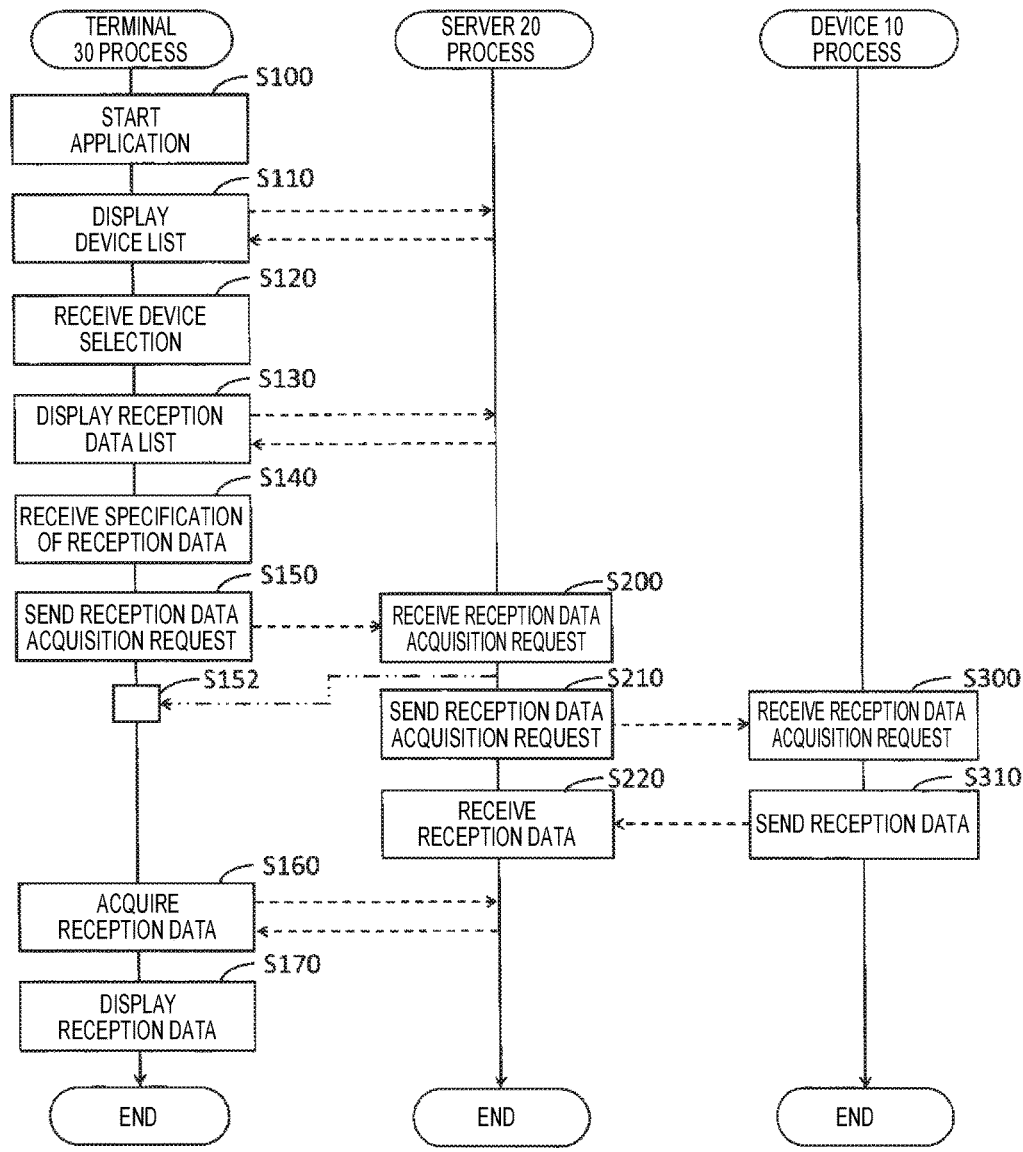
FIG. 3 is a flow chart of a reception data viewing process.

FIG. 3 is a flow chart of the reception data viewing process. For convenience, the processes executed by the terminal 30, server 20, and device 10 are shown in parallel in FIG. 3.

The terminal 30 (controller 32) first starts the application 32a (step S100). More specifically, the user, by operating the terminal 30, enables functions of the application 32a. The application 32a is dedicated software created for the reception data viewing process. Below, the process executed by the terminal 30 for the reception data viewing process is, basically, a process embodied by functions of the application 32a. However, the process the terminal 30 executes for the reception data viewing process is not limited to the application 32a, and may be embodied by functions of a web browser running on the terminal 30.

Next, the terminal 30 displays the device list DL of the server 20 on the display unit 34 (step S110). In this case, the terminal 30 requests the server 20 (controller 22) to send the device list DL. When this request is received, the server 20 (controller 22) sends the latest device list DL stored in the storage 23 at that time to the terminal 30 that sent the request. The terminal 30 can therefore acquire and can display the device list DL on the display unit 34.

Devices that can be controlled by the server 20 through the network NW, but are not devices that can receive faxes, may also be displayed in the device list DL. For example, printers without a fax capability, and scanners without a fax capability, may be included in the device list DL. As a result, in step S110, the terminal 30 extracts only those devices that can receive faxes from the device list DL received from the server 20, and may display the list of extracted devices on the display unit 34.

Alternatively, in step S110, the terminal 30 may request the server 20 to send a list of only devices that can receive faxes in the group of devices included in the device list DL. When the server 20 receives this request, the server 20 sends to the terminal 30 that sent the request a list, extracted from among the devices in the most recent device list DL, of only those devices that can receive faxes. As a result, the terminal 30 can display on the display unit 34 a list of devices that are included in the device list DL and can receive faxes.

In either event, in step S110, the terminal 30 displays on the display unit 34 at least part of the device list DL stored by the server 20.

Next, the terminal 30 receives the selection of a specific device 10 in the device list DL displayed on the display unit 34 (step S120). In other words, by operating the operation input unit 33, the user selects, from the device list DL displayed on the display unit 34, the device 10 for which to view the reception data, and the terminal 30 receives the selection.

Figure 4:
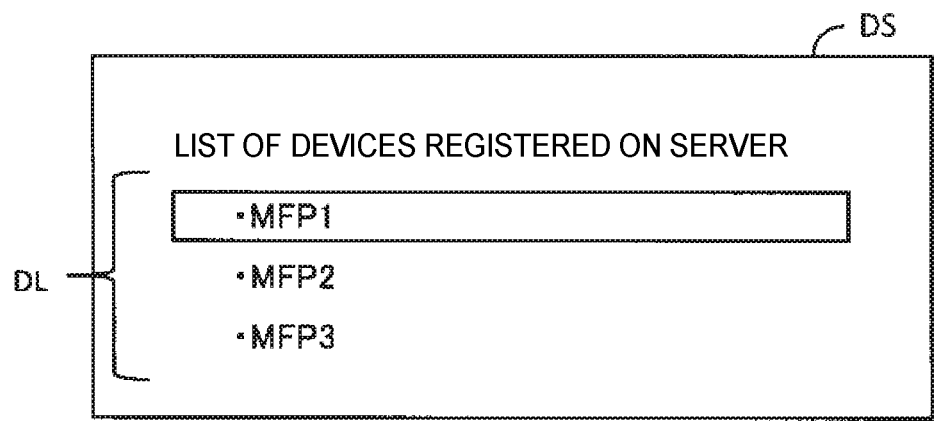
FIG. 4 shows an example of a device selection screen including a device list.

FIG. 4 shows an example of a device selection window DS including the device list DL. In the device list DL in FIG. 4, MFP1, MFP2, MFP3 are the product names of three devices. Each of these devices MFP1, MFP2, MFP3 is capable of receiving faxes. Using the operation input unit 33, the user can select, from the device list DL, the device 10 (MFP1 in this example) for which the reception data is to be reviewed.

Next, the terminal 30 displays, on the display unit 34, the reception data list related to the device 10 selected in step S120 (step S130).As described above, the server 20 also stores a reception data list related to each device 10 registered in the device list DL. The terminal 30 requests the server 20 to send the reception data list related to the device 10 selected in step S120. Receiving this request, the server 20 (controller 22) sends, to the terminal 30 that sent the request, the most recent reception data list stored for the selected device 10 in the storage 23. As a result, the terminal 30 can display on the display unit 34 the reception data list linked to the device 10 selected in step S120.

When requested by a terminal 30 to send the reception data list for a particular device 10, the server 20 may send a reception data list request or difference list request as described above to the device 10. The server 20 then receives the reception data list or difference list from the device 10 in response to the reception data list request or difference list request. The server 20 may then send the updated reception data list to the terminal 30. This configuration enables, instep S130, reliably displaying the most recent reception data list linked to the device 10 selected in step S120.

Next, the terminal 30 receives the selection of reception data from the reception data list displayed on the display unit 34 (step S140). In other words, using the operation input unit 33, the user selects, from the reception data list displayed on the display unit 34, one or more selections of reception data to view, and the terminal 30 receives the selection.

Figure 5:
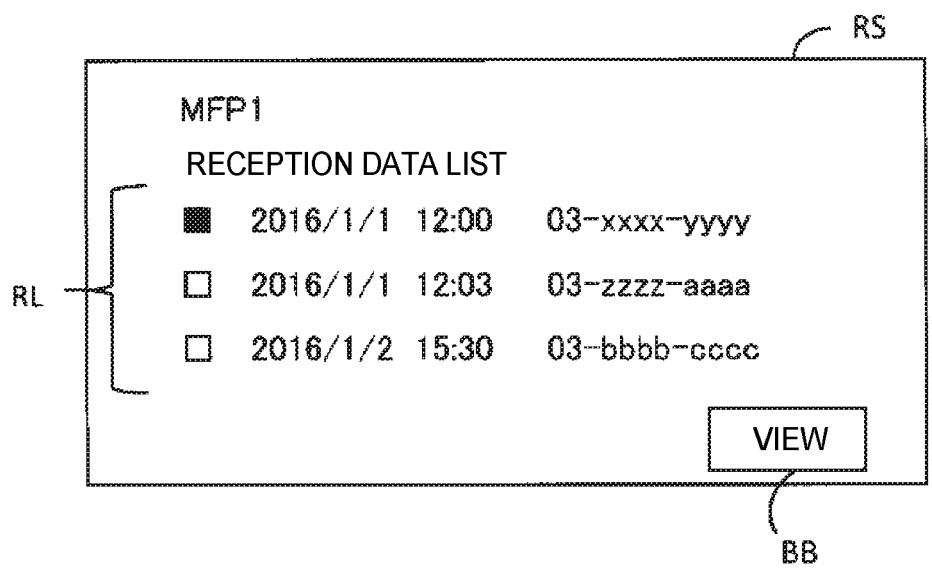
FIG. 5 shows an example of a reception data selection screen including a reception data list.

FIG. 5 shows an example of a reception data selection screen RS related to the device 10 (in this example, MFP1) displayed on the display unit 34 in step S130. In the reception data selection screen RS in this example, the reception data list RL contains, for each selection of reception data, the date and time when the fax was received, and the fax number (telephone number) from which the fax was sent. The user can select the desired reception data from the reception data selection screen RS.

As described above, when selection of a device 10 is received, and a selection of reception data from the reception data list linked to the selected device 10 is received, the terminal 30 sends a reception data acquisition request including the device 10 selection and reception data selection to the server 20 (step S1). More specifically, after selecting one or more reception data through the reception data selection screen RS, the user operates the view button BB in the reception data selection screen RS. In response to operation of the view button BB, the terminal 30 sends the reception data acquisition request to the server 20.

The server 20 (controller 22) then receives the reception data acquisition request sent from the terminal 30 (step S200). If, when the reception data acquisition request is received, the reception data specified by the reception data acquisition request has already been received from the device 10 specified in the same reception data acquisition request, the server 20 sends the reception data that was already received to the terminal 30 that sent the reception data acquisition request without going to step S210 (that is, returns control to step S152 as indicated by the double-dot dash line in FIG. 3). As a result, the terminal 30 receives (step S152) the reception data from the server 20 in response to the reception data acquisition request (step S150). When the reception data is received in step S152, the terminal 30 goes to step S170 without executing step S160 described below (or steps S162, S164). However, if, when the reception data acquisition request is received, the reception data specified by the reception data acquisition request has not been received from the device 10 specified in the same reception data acquisition request, the server 20 goes to step S210.

The server 20 then sends the reception data acquisition request received in step S200 to the device 10 (MFP1 in this example) specified in the reception data acquisition request (step S210). The device 10 to which the reception data acquisition request is sent is obviously a device already registered in the device list DL.

The device 10 (controller 12) receives the reception data acquisition request sent from the server 20 (step S300). The device 10 then reads the reception data specified in the reception data acquisition request from storage 14, and sends the reception data that was read to the server 20 (step S310).

The server 20 then receives the reception data from the device 10 in response to the reception data acquisition request sent in step S210 (step S220). When a reception data acquisition request is received from the server 20, the device 10 basically returns to the server 20 the reception data specified in the reception data acquisition request. However, in this embodiment, the device 10 is allowed to automatically send the reception data stored by the device 10 to the server 20 before a reception data acquisition request is received from the server 20.

If the reception data cannot be received directly from the server 20 in response to the reception data acquisition request sent in step S150, the terminal 30 receives the reception data from the server 20 after the server 20 acquires the reception data from the device 10 (step S160). More specifically, the terminal 30 requests the server 20 to send the reception data specified in the reception data acquisition request. When the terminal 30 requests the reception data from the server 20, and the reception data has already been received from the device 10 (step S220), the server 20 sends the reception data that was already received to the terminal 30. However, if the reception data has not already been received from the device 10 when the reception data is requested by the terminal 30, the server 20 cannot send the reception data to the terminal 30.

If the reception data cannot be sent to the terminal 30 when the reception data is requested by the terminal 30, the server 20 reports to the terminal 30 that the reception data has not been received. Alternatively, if the reception data can be received from the device 10 without reporting anything to the terminal 30 until reception data is received from the device 10, the server 20 sends the reception data that was received to the terminal 30. If the terminal 30 receives from the server 20 a report that the reception data has not been received, the terminal 30 repeats the reception data request to the server 20.

The terminal 30 then displays on the display unit 34 the reception data acquired from the server 20 in step S152 or step S160 (step S170). As a result, the user can view the reception data content (for example, the text expressed in the reception data).

Figure 6:
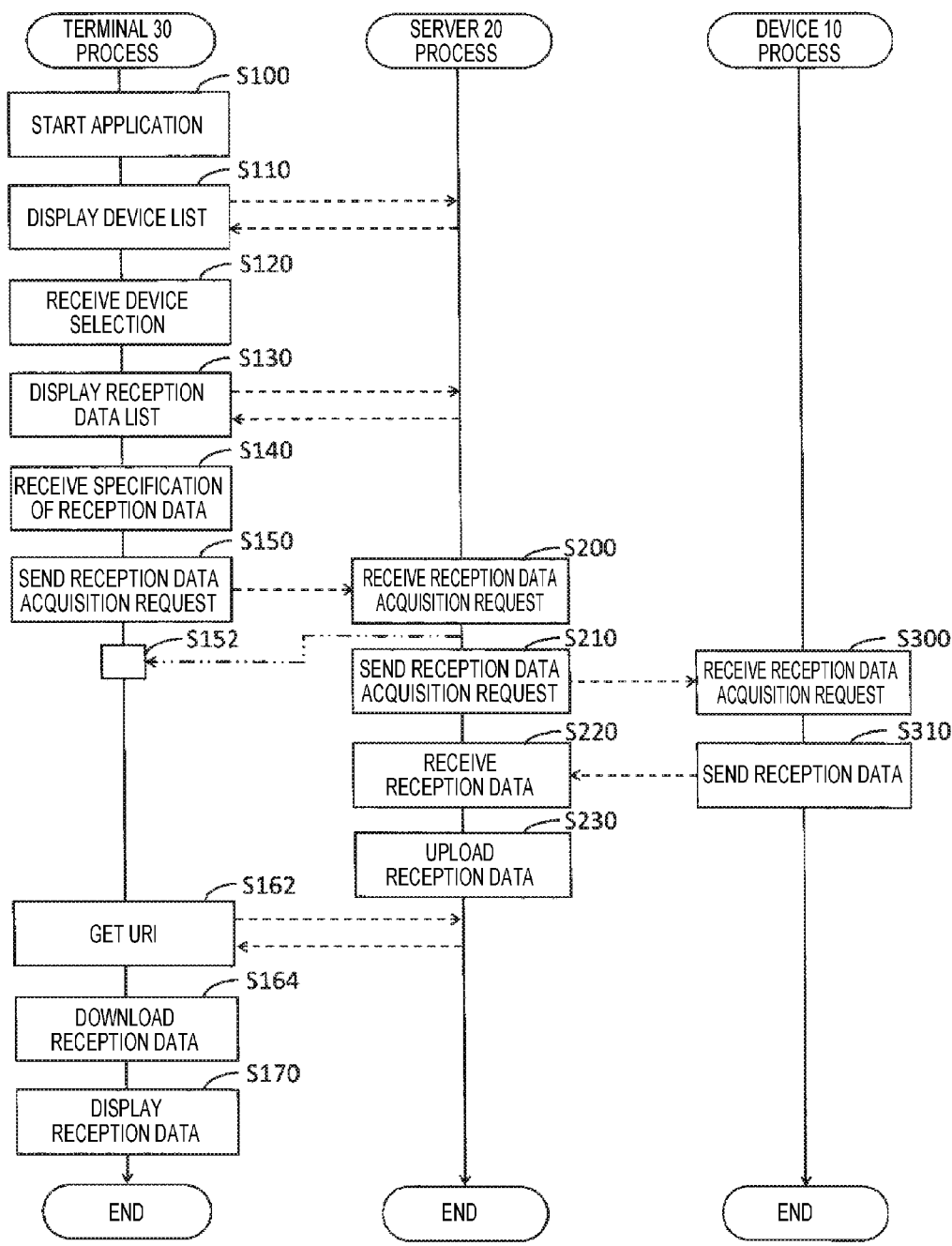
FIG. 6 is a flow chart if a reception data viewing process different from the process shown in FIG. 3.

FIG. 6 is a flow chart of a reception data viewing process different from the process shown in FIG. 3. The process shown in FIG. 3 may be referred to as an example of a first embodiment, and the process in FIG. 6 as an example of a second embodiment. Redundant description of content that is the same in FIG. 6 and FIG. 3 is omitted below.

The server 20 may execute step S230 after step S220, and the terminal 30 may execute steps S162 and S164 instead of step S160 in FIG. 3.

After receiving reception data from the device 10 (step S220), the server 20 uploads the reception data to a specific storage area that can be accessed through the network NW (step S230). This specific storage area is, for example, a server 20 connected to the network NW, or a storage area on a server 40 (see FIG. 1) separate from the server 20. Alternatively, the server 20 may store the address of the storage area to which such reception data is uploaded, that is, the specific address of the reception data (URI: Uniform Resource Identifier).

The terminal 30 then acquires the address (URI) of the reception data from the server 20 (step S162). More specifically, the server 20 requests the address (URI) of the reception data specific in the reception data acquisition request from the server 20. When the address (URI) of the reception data is requested by the terminal 30, and step S230 has already executed, the server 20 sends the address (URI) of the reception data to the terminal 30 in response to the request. If step S230 was not already executed when the address (URI) of the reception data is requested by the terminal 30, the server 20 reports to the terminal 30 that the address (URI) of the reception data cannot be sent. Alternatively, when the address (URI) of the reception data is requested by the terminal 30, the server 20 may execute step S230 and send the address (URI) of the reception data to the terminal 30 without reporting anything to the terminal 30 until step S230 executes. If a report that the address (URI) of the reception data cannot be sent is received, the terminal 30 repeats the request for the address (URI) of the reception data to the server 20.

Based on the address (URI) of the reception data acquired from the server 20 in step S162, the terminal 30 downloads the reception data from the specific storage area through the network NW (step S164). The terminal 30 then displays on the display unit 34 the reception data acquired in step S152 or downloaded in step S164 (step S170).

If the reception data specified in a reception data acquisition request has already been received from the device 10 specified in that reception data acquisition request when the reception data acquisition request from the terminal 30 is received in step S200, the server 20 can also upload the reception data already received to a specific storage area accessible through the network NW. The server 20 then reports the address (URI) to which the reception data was uploaded to the terminal 30, enabling the terminal 30 to download the reception data from the specific storage area through the network NW based on the address (URI).

5. Summary

In this example, the device 10 registers itself as a device that can receive faxes in the server 20 (FIG. 2). The device 10 then sends the received fax data to the server 20. When selection of a registered device 10 (a reception data acquisition request including a device 10 selection) is then received from a terminal 30 connected to the network NW (step S200), the server 20 provides the reception data received from the specified device 10 to the terminal 30. In other words, the user is provided with an environment enabling registering devices 10 that can receive faxes in a server 20 (cloud server) that can provide a service to users through the Internet. By the user operating a terminal 30 to access the server 20 and specify a device 10 registered on the server 20, this configuration enables the user to receive, through the server 20, fax data received by the specified device 10. Because the server 20, which is a server providing a service to users through the Internet, is always on, the user can, at any desired time, use a terminal 30 to view reception data through the server 20.

In this example, the server 20 stores (uploads) to a specific storage area accessible through a network NW reception data received from a specified device 10, reports the address (URI) of the stored reception data to a terminal 30, and thereby enables the terminal 30 to acquire (download) reception data based on the address (URI) (see FIG. 6). This configuration enables the terminal 30 to download, based on the address (URI), fax data received by a specified device 10. Fax data received by a device 10 can therefore be stored on a server 40 other than the server 20. By uploading reception data to be downloaded on a server 40 other than server 20, use of the storage capacity on the server 20 can be suppressed.

In this configuration, the server 20 updates the reception data list for each registered device 10 based on a reception data update report sent from the device 10. When selection of reception data contained in the reception data list corresponding to a specified device 10 is received from a terminal 30 (step S200), the server 20 provides the specified reception data to the terminal 30. Thus comprised, the most recent reception data list for a specified device 10 can be provided to the user, and the user can select reception data to view from the most recent reception data list.

Note that the device 10 may delete reception data after sending the reception data to the server 20. For example, after sending reception data in step S310 (FIG. 3, FIG. 6) to the server 20, the device 10 may immediately delete the reception data that was sent from the storage 14. Alternatively, when acquiring the reception data is successful in step S152 or S160 (FIG. 3), or step S152 or S164 (in FIG. 6), the terminal 30 may send a command to delete the acquired reception data through the server 20 to the device 10. When a delete command is received, the device 10 deletes the reception data from the storage 14 based on the deletion command. This configuration enables maintaining storage capacity on the device 10 while also preventing unnecessary data loss.

The entire disclosure of Japanese Patent Application No. 2016-105684, filed May 26, 2016 is expressly incorporated by reference herein.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A fax system for selecting a fax device in a distributed network, the fax system comprising:
   one or more fax devices with a fax reception capability;
   a server that controls the one or more fax devices, the server being connected to the one or more fax devices through a network; and
   a terminal connected to the server through the network, the terminal including a user interface that allows a user to specify one of the one or more fax devices for receiving fax data for the user,
   wherein:
   the one or more fax devices register on the server as devices that can receive fax data, and sends received fax data to the server; and
   the server receives from the terminal specification information that specifies one of the one or more fax devices that are registered on the server as being a fax device that can receive fax data on behalf of the user, and provides to the terminal the received fax data that is received from the specified fax device.

2. The fax system described in claim 1, wherein:
   the server stores the received fax data received from the specified fax device to a specific storage area accessible through the network,
   reports the address of the stored received fax data to the terminal, and
   enables the terminal to acquire the received fax data based on the address.

3. The fax system described in claim 1, wherein:
   the server updates a received fax data list for each registered fax device based on a received fax data update report sent from each registered fax device, and when the terminal specifies received fax data contained in the received fax data list corresponding to the specified fax device, provides the specified received fax data to the terminal.

4. The fax system described in claim 1, wherein the specified fax device deletes the received fax data after sending the received fax data to the server.

* * * * *